COLLECTOR

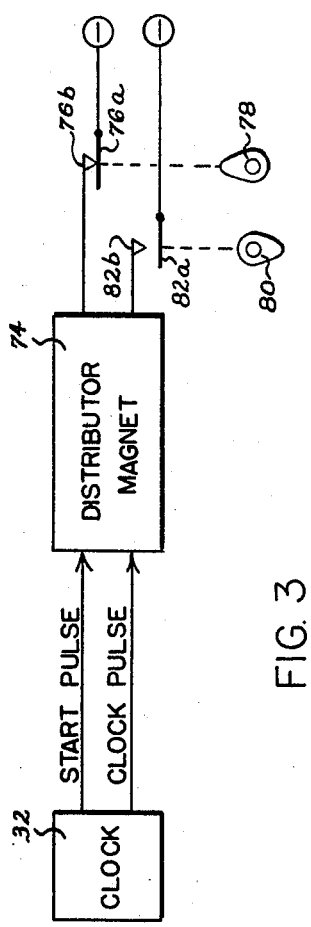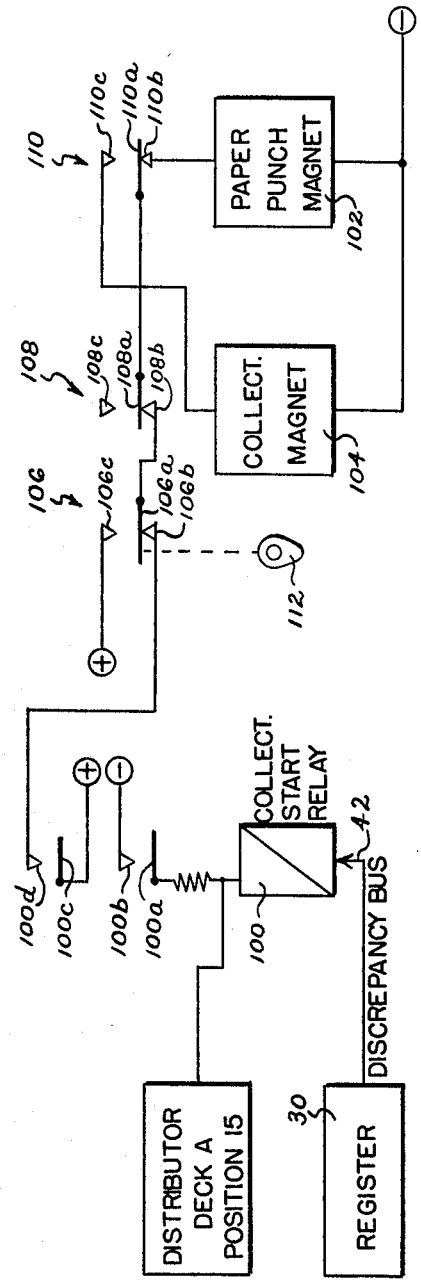
FIG. 3
FIG. 6
INVENTOR.
BJØRN A. RORHOLT
BY
Russell, Chittick & Pfund

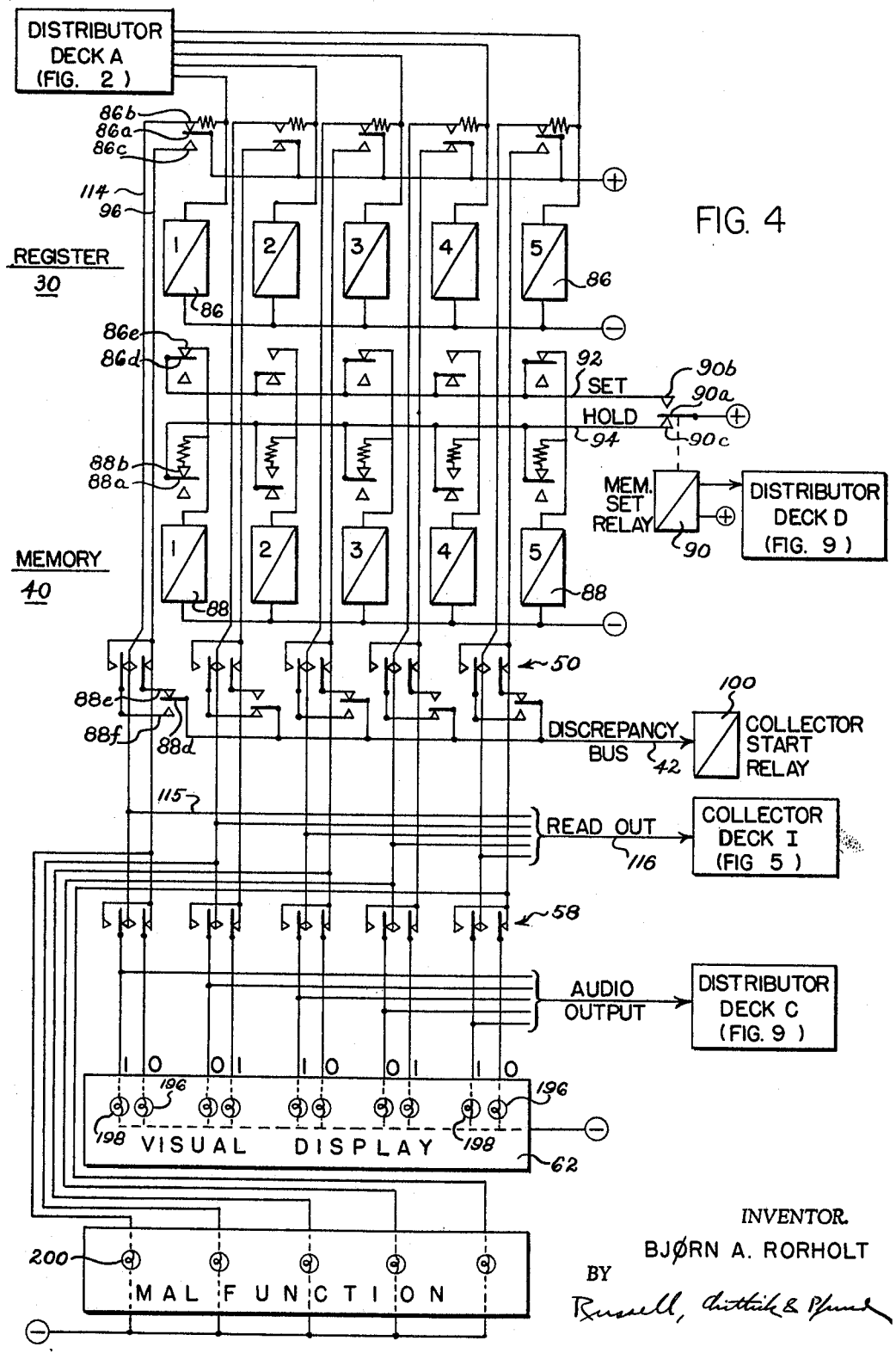

REMOTE CONTROL – TIME MARKS – STATION CHECKS

DISTRIBUTOR – AUDIO REPRODUCTION

INVENTOR.
BJØRN A. RORHOLT

United States Patent Office 3,478,318
Patented Nov. 11, 1969

3,478,318
SLOW DATA RATE TELEMETERING AND DATA LOGGING SYSTEM HAVING AURAL ALARM MEANS
Bjørn A. Rørholt, Slemdal, Oslo, Norway, assignor to Tele-Data, Inc., Boston, Mass., a corporation of Massachusetts
Filed Oct. 19, 1965, Ser. No. 498,015
Claims priority, application Norway, Dec. 18, 1964, 156,040
Int. Cl. H04q 1/00, 3/00, 5/00
U.S. Cl. 340—150    11 Claims

ABSTRACT OF THE DISCLOSURE

A time division, multiplexed, telemetering and data logging system employing teletype control, reporting and data logging signals. The data recording function is operative only when the received teletype reporting signal differs from a predetermined binary pattern programmed into the central station equipment. Provision is made for an aural reproduction of the incoming binary teletype signal.

---

This invention relates to telemetering and data logging systems and more particularly to a slow data rate system for transmitting, receiving and processing time division multiplexed binary telemetering data.

The use of telemetering systems for monitoring and controlling physically remote or substantially inaccessible installations is well known. The complexity and cost of instrumenting various types of telemetering systems are, to a large extent, dependent upon the system parameters of information transmission rate and the method of multiplexing. For example, if a relatively high information transmission rate is used in a time division multiplexed system, a substantial frequency band width must be allocated for each telemetering channel and the frequency pass bands of the telemetering transmission and reception equipment must be sufficient to handle the frequencies encountered in the high speed transmission of telemetering data. Adequate pass band characteristics for the transmission and reception equipment are, of course, well within the state of the art, but they can be obtained only by sacrificing the factors of circuit simplicity, band width and cost. In addition, more sophisticated and expensive circuitry is usually required in the associated data handling and processing equipment. Conversely, if the information transmission rate is relatively slow, i.e., each bit having a duration of the order of 50 to 250 milliseconds, the required band width of the telemetering channel and the frequency pass bands of the transmission, reception and data processing equipment can be reduced significantly with a concomitant reduction not only in the complexity and initial cost of the telemetering equipment, but also in the cost of maintaining the equipment.

The present invention relates to telemetering systems in the latter category and has as a general object the provision of a slow data rate telemetering system for transmitting, receiving and utilizing binary telemetering data from a plurality of out stations.

A more specific object of the present invention is to provide a slow data rate telemetering system wherein the telemetering data is handled and processed by conventional, relatively inexpensive equipment including teletype perforators, printers and line transmitters.

It is a feature of the invention that recording of out station reports will be initiated only when the present report differs from a preset pattern or from the preceding report. Another feature of the invention is that appropriate out station identificaion marks are automatically inserted at the beginning of each recorded out station report while other marks are automatically placed at the end of each recording to indicate both the date and time of the out station report.

It is another object of the present invention to provide an audio reproduction of the incoming binary report from each out station and to provide means for correcting any selected portion of the audio reproduction to make the entire reproduction conform to a predetermined aural rhythm.

It is still another object of the invention to provide a visual display of the last received report from each out station. It is a feature of the visual display means of the present invention that the display of any portion of an out station report can be changed selectively to provide either a "normal" or "fault" indication.

It is a further object of the present invention to provide remote control of out station functions. It is a feature of the remote control instrumentation of the slow data rate telemetering system that remote control messages are automatically recorded with appropriate teletype characters indicating both the identity of the remote controlled out station and the date/time of the remote control transmission. It is another feature of the present invention that facilities are provided for checking each out station and for automatically indicating on the teletype recording the date and time of each station check.

It is still a further object of the present invention to provide a generator for producing teletype time/date marks in 5-bit teletypewriter code.

These and other objects and features of the invention will be best understood from a more detailed description of a preferred embodiment thereof, selected for purposes of illustration and shown in the accompanying drawings in which:

FIG. 3 is a schematic diagram of the distributor actuating circuit;

FIG. 4 is a partial schematic and block diagram of a telemetering system register;

FIG. 6 is a partial schematic and block diagram of the collector and teletype paper punch actuating circuits;

Figure 1:
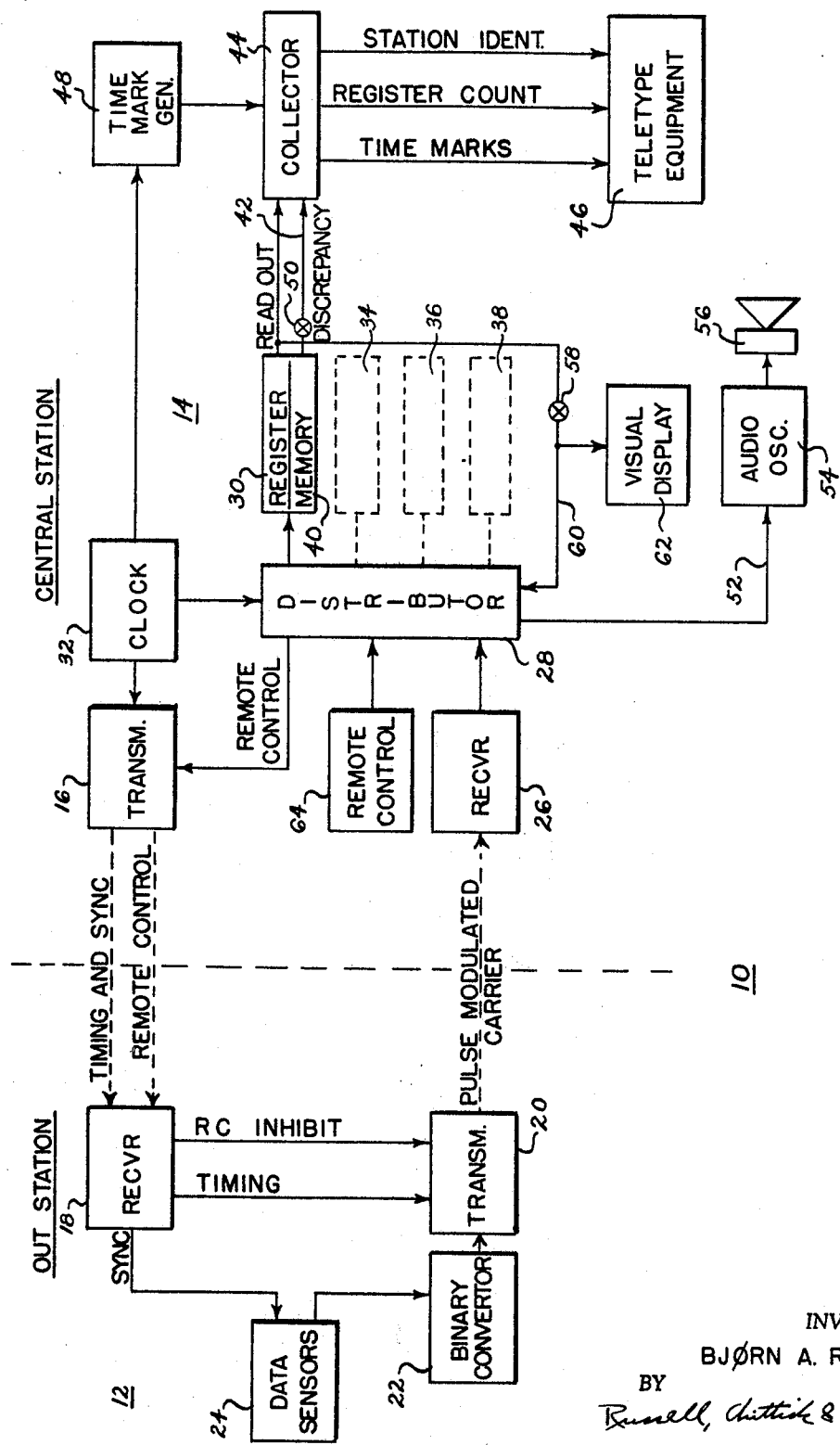
FIG. 1 is a block diagram of a slow data rate telemetering system.

Turning now to the drawings, the slow data rate telemetering system of the present invention is depicted in FIG. 1 in block diagram form and indicated generally by the reference numeral 10. The telemetering system 10 comprises one or more "out" stations 12 which report by radio on a common frequency to a central station 14 at predetermined intervals. The number of reporting out stations 12 is determined by the design requirements of the particular telemetering system. For purposes of illustration, the slow data rate telemetering system 10 depicted in the drawings and described herein has four out stations 12, one of which is shown on the left hand side of the dashed line in FIG. 1, and a single central station 14 designed to handle the incoming sequential reports from the four out stations. It will be apparent that additional out stations 12 can be added to the slow data rate telemetering system 10 by duplicating certain components, hereinafter described, in the central station 14. Moreover, the information handling facilities of the central station 14 also can be duplicated to provide multiple location monitoring of the out station reports.

The slow data rate telemetering system 10 of the present invention operates in a time division multiplexed mode with each out station 12 transmitting binary telemetering data only during its assigned transmission interval. The timing and synchronization signals required for time division multiplexing are transmitted from the central station transmitter 16 to each of the out station receivers 18. After demodulation in the out station receiver 18, the synchronization and timing signals are used, respectively, to control the time duration of each binary digit in the out station reporting message and the initiation of the out station transmission.

Each out station transmitter 20 transmits the out station's binary telemetering data in the form of a pulse modulated carrier. The keying control signals for pulse modulating the out station's transmitter carrier frequency are obtained from a binary converter 22 and represent, in binary form, the data derived from a plurality of data sensors 24. The information from each of the data sensors 24 is collected in a predetermined order and time synchronized by the synchronization signals from out station receiver 18. The informational input to the binary converter 22 thus consists of a series of time synchronized electrical signals each having a characteristic which varies in accordance with the measurement parameter of the respective data sensor. The series of electrical signals from data sensors 24 is converted by the binary converter 22 into a synchronized binary pulse train which pulse modulates the out station transmitter carrier whenever a timing control signal is obtained from the out station receiver 18.

The incoming telemetered binary message from each out station 12 is received at the central station 14 by a receiver 26 tuned to the common telemetering frequency. The pulse modulated carrier from the reporting out station is demodulated in receiver 26 and fed to a time synchronized distributor 28 which sequentially distributes the binary DC pulses to a multiple stage register 30. Time synchronization of the distribution of the demodulated binary pulse train to the central station register 30 is obtained by means of clock pulses from a master clock 32. The clock pulses from master clock 32 also provide a time reference for the transmission of the timing and synchronization signals by the central station transmitter 16. Since the generation and transmission of the binary pulse train from each out station 12 is time synchronized with the action of the central station distributor 28, the count of each stage in out station regiser 30 will be equal to the binary value of the corresponding bit in the input pulse train to the out station transmitter 20.

It has already been mentioned that the preferred embodiment of the slow data rate telemetering system 10 is designed to handle telemetered reports from four out stations at a single central station. In the block diagram of FIG. 1 the incoming report from out station 12 is fed through distributor 28 to register 30. Similar registers, shown in dotted lines and indicated by the reference numerals 34, 36 and 38 are provided to store the telemetered reports from the three other out stations. Each one of the four out station registers has a plurality of register stages corresponding in number to the number of bits in each reporting message from the out stations. In the preferred embodiment of the slow data rate telemetering system, the reporting message from each out station consists of fifteen bits, numbered "0" through "14." The "0" bit is always a "space," i.e., out station transmitter carrier off, and provides an opening for the central station transmitter 16 to transmit a remote control pulse to the out station receiver 18. The reception of a remote control pulse from the central station transmitter 16 during bit "0" time inhibits the transmission of the out station message and opens the remote control portion of the out station receiver 18 for reception of a remote control message from the central station.

The information portion of out station reporting message comprises fourteen bits, numbered "1" through "14," each of which represents a separate on or off function at the out station. These fourteen bits form the binary data input pulse train to the out station transmitter 20. Since this pulse train keys the out station transmitter 20, it can be seen that the on or off condition of the transmitter carrier is determined by the binary value of each bit in the reporting message. For purposes which will be explained hereinafter, a normal situation at each out station will cause the out station transmitter 20 to be keyed only during odd numbered bits so that a normal message from an out station will comprise seven bursts of transmitter carrier separated by a corresponding number of intervals of equal duration.

The fourteen bit telemetered message from each out station 12 is fed to the respective out station register by the distributor 28, as explained previously. The four out station registers each have a plurality of memory units 40 which correspond in number to the number of register stages in each register 30. The memory unit 40 holds the count of the corresponding register stages until the next succeeding binary message is received from the respective out station. If the next succeeding binary message is identical to the previously received message which is stored in the memory units, no further action will be taken by the central station equipment. However, if a discrepancy exists between the binary count of one or more bits of the incoming binary message and the corresponding bits held in the memory units, then a discrepancy output signal will appear on discrepancy bus 42.

The presence of a discrepancy signal on the discrepancy bus 42 actuates a collector mechanism 44 which sequentially reads the binary count of each stage of the out station register. The sequential readout of the register 30 by collector 44 converts the parallel binary data in register 30 to a series signal which is fed to standard teletype recording equipment 46. The teletype equipment 46 produces a permanent recording of the out station message which contained the discrepancy or discrepancies. Conventional 5-bit code teletype perforators, printers and line transmitters are equally compatible with the slow data rate telemetering system 10 and can be connected directly to the collector 44 to perform their respective functions.

In order to identify the out station which reported a discrepancy, the discrepancy signal on bus 42 is also used to cause a station identifying teletype character to be recorded before the out station message. In addition, a time mark generator 48 supplies teletype time marks which are inserted at the end of the out station message recording to indicate the time and date of the out station discrepancy.

In many out station installations, the message generating equipment is duplicated to provide continuous telemetering data even in the case of equipment failure. The two sets of equipment are customarily used alternately to transmit the out station report. However, if a fault should occur in one of the duplicate sets of transmitting equipment, the resulting faulty bit will always cause a discrepancy in the register between the count of the incoming bit to the register stage and the count of the previous message bit which is stored in the corresponding memory unit. If no corrective action is taken either at the out station 12 or at the central station 14, the collector 44 and teletype recording equipment 46 will be actuated each time a message is received from the out station.

Since the out stations 12 will generally be placed in remote or substantially inaccessible locations, it is preferable to provide means for correcting the effect of the faulty bit at the central station 14. In the slow data rate telemetering system 10 this is accomplished by "discrepancy reverse" switches 50 which are indicated representationally in the block diagram of FIG. 1. The circuitry and operation of the discrepancy reverse switches 50 will be described hereinafter in connection with FIG. 4. For the moment, however, it is sufficient to state that the discrepancy reverse switches 50 can be used to negate the effect of any faulty bit or bits caused by a failure in one of the duplicate sets of out station equipment.

It has already been mentioned that one of the objects of the present invention is to provide an audio reproduction of the incoming telemetered message. This object is achieved by parallel coupling each stage of the out station registers to corresponding contacts (not shown in FIG. 1) on the distributor 28. The distributor 28 performs a parallel-to-series conversion so that the distributor output on line 52 comprises a binary pulse train in which the pulses have binary values corresponding to the count of register 30. The reconstituted series binary pulse train keys an audio oscillator 54 each time the binary value of a particular pulse in the binary pulse train is ONE. It will be readily apparent that the audio oscillator 54 will drive loud-speaker 56 each time the out station transmitter 20 is keyed. Since the normal reporting message from an out station consists of equal duration alternating "marks" and "spaces," i.e., transmitter carrier ON and transmitter carrier OFF, respectively, the audio oscillator 54 will produce seven rhythmic "pips" which may easily be distinguished by the ear.

In many situations a change at the out station 12 does not necessarily mean a fault which has to be corrected, but rather merely indicates a change-over between equivalent states which are both equally "normal." For example, in an out station microwave radio relay installation, the navigational warning lights will turn on at sunset and off at sunrise. Although these two conditions are completely normal, the change-over from one state to another will change the binary value of the bit representing the condition of the navigational lights thereby causing a corresponding change in the aural rhythm of the audio oscillator "pips." In this case, it is convenient for the supervisory staff if the "acceptable" or "stable" condition is always represented by the same rhythmic seven pip signal even if the incoming signal has a different rhythm. For this reason, an audio reverse switch 58 is provided in each of the parallel coupling leads 60 from the out station register 30 to the distributor 28 to permit the binary reversal of any selected bit in the out station reporting message.

The operation of the audio reverse switches 58 can best be understood by examining a typical situation, such as that presented by the navigational lights mentioned above. If it is assumed that bit "1" in the out station reporting message represents the status of the navigational lights, and further, that the binary value ONE represents the ON condition of the navigational lights, then the value of the first bit in the out station reporting message will change from ONE to ZERO when the navigational lights turn off at sunrise. Once the navigational lights have been turned off, the audio oscillator 54 will not be keyed until the third bit in the out station reporting message because the audio oscillator 54 is keyed only by pulses on line 52 which have a binary value of ONE. This, of course, produces an easily detectable change in the audio rhythm from loud-speaker 56. The normal seven tone rhythm can be restored by actuating the first bit audio reverse switch 58 which changes the binary value of the first bit from ZERO to ONE.

Although the audio reproduction of the incoming out station message provides an easily comprehended indication of the count in each out station register, it is also desirable to have a visual presentation of the register count. This is provided in the slow data rate telemetering system by a visual display 62. The visual display 62 produces a "normal" indication whenever the incoming out station message comprises the previously described alternating seven carrier burst message. If one bit in the out station message changes, as described in the preceding paragraph, the visual display 62 will indicate a "fault" condition for that particular bit. The visual display indication can also be corrected by audio reverse switches 58 or by separate visual reverse switches (not shown) which perform the same function.

It has already been mentioned that one of the objects of the present invention is to provide remote control of out station functions. This is accomplished in the slow data rate telemetering system by a remote control unit 64 which keys the central station transmitter 16 during the "0" bit time of the out station reporting message. When the remote control pulse is received by the out station receiver 18, it inhibits the transmission of the out station message, i.e., bits "1" through "14" and opens up the remote control portion of the out station receiver. During the time allocated to the transmission of the out station reporting message, the central station 14 transmits a seven bit remote control message which is then repeated in inverted form. In the simplest form, the seven bit remote control message will control seven remote functions at each out station. It should be noted, however, that a matrix combination of the seven remote control bits will give a maximum of 128 remote control actions.

Having described the overall operation of the slow data rate telemetering system 10 at a block diagram level, I will now describe the circuitry and functions of the major components of the telemetering system's central station 14. The procedure to be followed hereinafter will be to describe the common central station components, that is, the receiver 26, distributor 28 and register 30 and then describe the separate components which utilize the count of the out station register, specifically, the teletype, audio reproduction and visual display equipment.

RECEIVER

The central station telemetering receiver 26 is preferably a crystal controlled, fixed frequency receiver having an extremely narrow pass band characteristic. The circuitry and construction of such receivers are well known and will not be described herein. Instead, certain characteristics of the telemetering receiver 26 will be enumerated to provide an understanding of the function of the receiver and its relationship to the other components in the slow data rate telemetering system.

Functionally, the central station receiver 26 must be capable of receiving the telemetered pulse modulated carrier signals from all out stations in the telemetering system. The operational parameters of receiver sensitivity and selectivity are best stated qualitatively rather than quantitatively. Thus, receiver sensitivity must be sufficient to permit reception of all out station transmissions above the useable receiver signal-to-noise threshold. Likewise, the tuning circuits of the central station receiver 26 must be sufficiently selective to discriminate against all but the preselected out station transmitting frequency.

An extremely narrow frequency pass band can be employed in the central station receiver 26 because of the telemetering system's relatively slow information transmission rate. With the previously mentioned telemetering message bit duration of 150 milliseconds, pass bands as low as 15.0 cycles per second are feasible in the slow data rate telemetering system. The extremely narrow pass band of the central station receiver 26 is advantageous because it produces a significant reduction in transmission interference and a concomitant increase in the validity of any received signal.

After reception and conversion to one or more intermediate frequencies, the out station pulse modulated carrier signal is demodulated to form a binary pulse train which corresponds bit-for-bit to the pulse train from the out station binary converter 22. The demodulated pulse train from central station receiver 26 comprises a series of direct current pulses which vary between a positive potential (binary value of ONE) and a negative potential (binary value of ZERO). Since the pulse train at this stage in the slow data rate telemetering system contains all of the information obtained from each of the out station data sensors 24, the pulse train can be used directly in some applications. However, it is usually more convenient to store the binary telemetered information in parallel form and then reconstitute the original series binary pulse train for subsequent data processing. In the slow data rate telemetering system 10 the conversion of the detected series binary pulse train to parallel form is accomplished by the central station distributor 28 which is shown in partial schematic and block diagram form in FIG. 2.

DISTRIBUTOR

An electromechanical distributor has been selected for the preferred embodiment of the slow data rate telemetering system because it provides the desired series-to-parallel data conversion at a minimum expenditure and without sacrificing the inherent advantages of circuit simplicity. The major component of distributor 28 is a 30-position rotary stepping switch 66 with six independent "decks" which are alphabetically identified by the capital letters A through F. Each distributor deck has thirty switch positions each of which constitutes a two connection NO contact which is closed only when the stepping switch is in that particular position. The number of distributor decks and the number of switch positions in each deck are dictated by the number of out stations 12 in the telemetering system 10, the number of bits per out station reporting message and by the number of accessory switching functions, e.g., remote control, which are assigned to the distributor 28.

Figure 2:
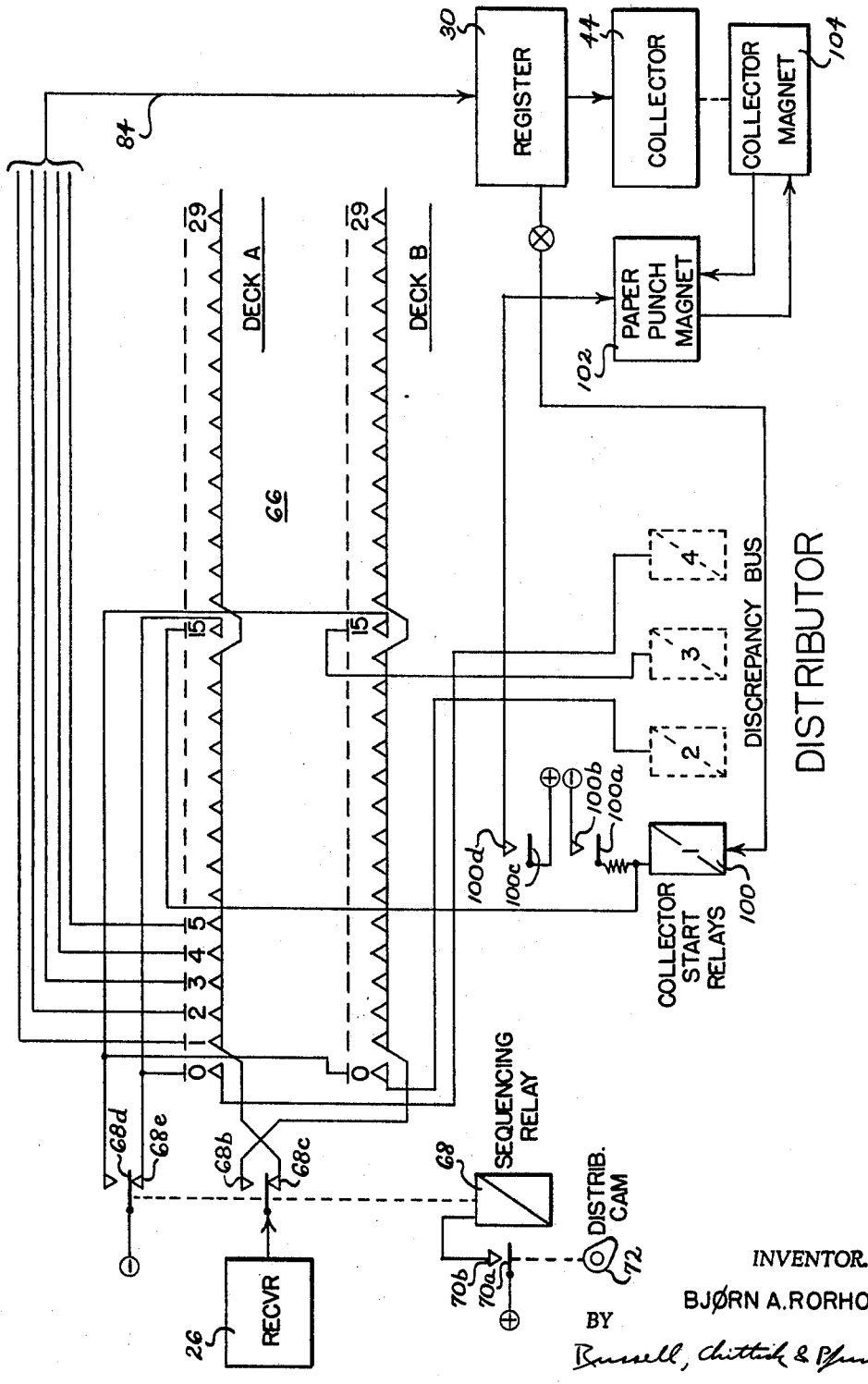
FIG. 2 is a partial schematic and block diagram of a telemetering system distributor.
Figure 9:
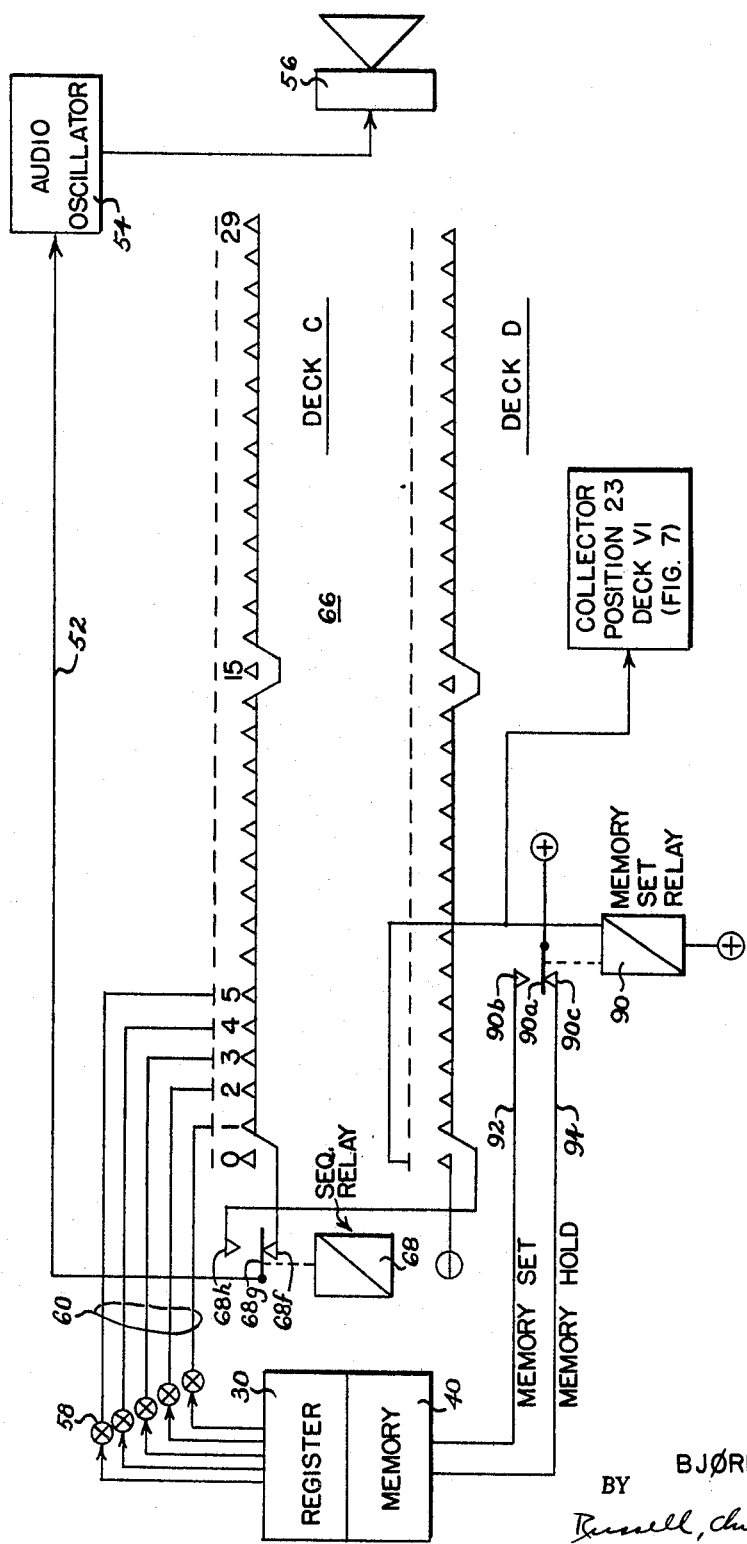
FIG. 9 is a partial schematic and block diagram of the telemetering system audio reproduction circuits.
Figure 10:
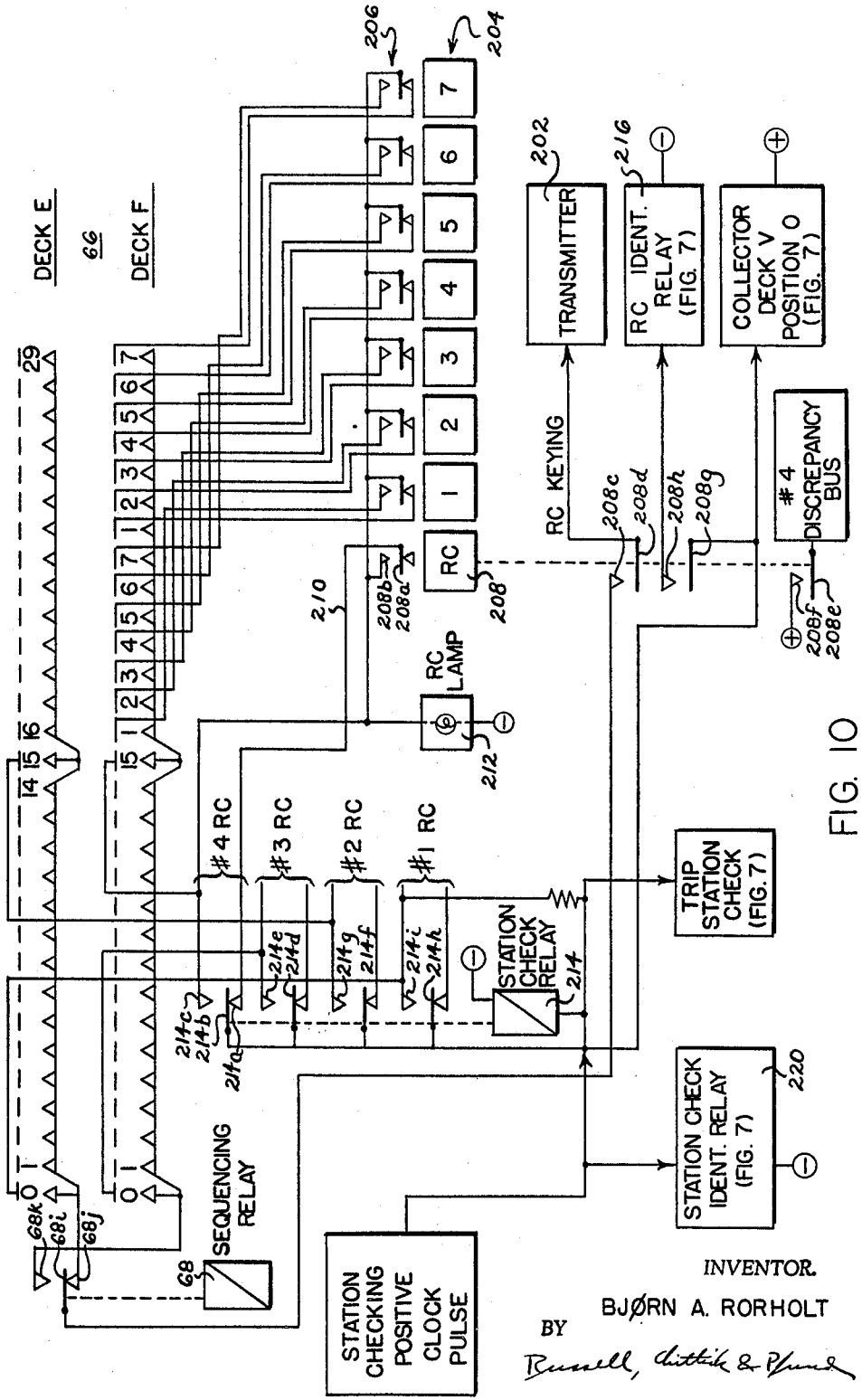
FIG. 10 is a partial schematic and block diagram of the slow data rate telemetering system remote control circuits.

For purposes of clarity, each of the switching functions performed by distributor 28 are depicted in separate figures in the drawings and with only the applicable distributor decks shown therein. Distributor decks A and B, which perform the series-to-parallel data conversion of the detected binary pulse train, are shown in FIG. 2 in schematic form while the associated input and output components, e.g., receiver 26, register 30 and collector 44 are shown in block diagram form. The audio reproduction switching functions of the distributor stepping switch 66 are assigned to distributor decks C and D which are depicted in FIG. 9. Distributor decks E and F are shown in FIG. 10 and are used in connection with the remote control function of the slow data rate telemetering system.

In order to simplify the schematic presentation of the slow data rate telemetering system, only the wiring associated with the handling of the first out station telemetered message is shown in the figures and within each figure, only the wiring for message bits "1" through "5" is shown for purposes of clarity. It should be understood, however, that duplicate wiring is employed for the remaining message bits and for the second, third and fourth out stations.

Looking now at FIG. 2, it can be seen that distributor decks A and B provide a total of sixty switch positions which cover the fifteen bit telemetered messages from each of the four out stations 12. Since the "0" bit in each out station report is a "space," the "0" and "15" switch positions on both decks A and B can be used for other control purposes as will be explained subsequently. The incoming message from the first out station will be sequentially switched through distributor deck A switch positions "1" through "14." Similarly, the fourteen bit reporting message from the second out station will be sequentially switched through distributor deck A switch positions "16" through "29." During the second revolution of the distributor rotary switch 66, the output from receiver 26 will be switched by sequencing relay 68 through contacts 68a and 68b to deck B of the distributor. Switch positions "1" through "14" on deck B are used for the third out station reporting message while the fourth out station reporting message is switched through switch positions "16" through "29" on deck B.

The switching of the sequencing relay transfer contact 68a from contact 68c to 68b is synchronized with the rotation of the distributor switch 66. At the end of the first revolution, sequencing relay 68 is energized to transfer the receiver output from deck A to deck B on distributor rotary switch 66. The energization of sequencing relay 68 at the end of the first distributor switch revolution is obtained by means of distributor cam actuated switch contacts 70a and 70b. Distributor cam 72 is mounted on the shaft of the rotary distributor switch 66 at a predetermined position so that the cam surface will close switch contacts 70a and 70b at the end of the first distributor revolution. The distributor cam surface which is shown representationally in FIG. 2 will cause switch contacts 70a and 70b to stay closed during the entire second revolution of the distributor stepping switch 66.

The operation of distributor 28 can best be understood by examining the operational cycle of the distributor stepping switch 66 with respect to the first out station reporting message. With the distributor switch 66 in position "0" at the beginning of the out station report, the sequencing relay 68 will be de-energized and the output from central station receiver 26 will be coupled through sequencing relay contacts 68a and 68c to deck A of the distributor switch. Since the incoming "0" bit in the out station message will always be a "space," the distributor switch 66 has an interval of 150 milliseconds to step from the "0" switch position to the "1" switch position. The initial stepping action of the distributor switch 66 and all subsequent stepping actions must be time synchronized with the incoming out station report to maintain coherence. The time synchronized actuation of the distributor stepping switch is obtained by means of master clock generated pulses which energize distributor electromagnet 74 (See FIG. 3) at 150 millisecond intervals.

Referring to FIG. 3, the master clock 32 supplies two types of timing pulses to the distributor electromagnet 74: a "start" pulse and a "clock" pulse. The start pulse is sent from the master clock 32 to the distributor magnet during the "0" bit of the incoming out station message to step the distributor rotary switch 66 from the "0" switch position to the "1" position. The "start" pulse circuit for the distributor magnet 74 is shown in FIG. 3 and includes switching contacts 76a and 76b which are closed only when the distributor stepping switch 66 is in the "0" position. The switch contacts 76a and 76b are closed by a distributor cam 78 which is representationally depicted in FIG. 3. Another distributor cam 80, also shown representationally in FIG. 3, closes switch contacts 82a and 82b during the information portion of the out station message, i.e., during the interval occupied by bits "1" through "14." The cam operated switch contacts 82a and 82b provide an actuating circuit for distributor magnet 74, which is energized by "clock" pulses from master clock 32 at 150 milliseconds intervals. As the distributor switch 66 steps through switch positions "1"–"14" in synchronization with the incoming out station message, the message bits are switched to fourteen leads, indicated collectively by the reference numeral 84, which are connected to the central station register 30. As explained above, only five of the fourteen leads are shown in FIG. 2 for purposes of clarity.

REGISTER

The central station register 30 for the first out station is depicted in partial schematic and block diagram form in FIG. 4. Register 30 has fourteen counting stages corresponding to the fourteen information bits in the out station reporting message. Only five of the fourteen register stages are shown in FIG. 4 and these five stages are coupled to switch positions "1" through "5," respectively, on distributor switch deck A. Each counting stage of register 30 comprises a register relay 86 and its associated relay contacts hereinafter numerically identified. As mentioned previously, each stage of register 30 has a corresponding memory unit 40 comprising a memory relay 88 and associated relay contacts also hereinafter numerically identified. The register relays corresponding to distributor deck A switch positions "1," "3" and "5" are shown in an energization condition in FIG. 4 while the relays corresponding to distributor switch positions "2" and "4" are shown in a de-energized condition. The alternating energized and de-energized register relays 86 represents a portion of a "normal" out station message in which seven carrier bursts are separated by seven intervals of equal duration.

The memory unit relays 88 are shown in the same energization state as their corresponding register relays 86. It should be noted, however, that at the beginning of the very first out station reporting message all memory unit relays 88 would be de-energized. The operation of the memory unit relays 88 can be understood by assuming this initial condition, i.e., all memory unit relays de-energized, and then examining the action of the memory unit relays at the completion of the first reporting message from the out station 12.

Register 30 will hold the binary count of the incoming message at the end of the fourteenth message bit. At this time, each register relay 86 which was initially energized by an incoming binary ONE message bit will remain energized through holding contacts 86a and 86b and will continue to hold until the binary value of the corresponding message bit changes from ONE to ZERO.

The rotation of the distributor stepping switch 66 continues through distributor deck A switch positions "16"–"29" which perform the series-to-parallel conversion of the incoming telemetered message from the second out station. When the distributor stepping switch 66 reaches the "0" position at the beginning of its second revolution, voltage is applied to a memory set relay 90 through the "0" switch position on deck D of the distributor stepping switch ts shown in FIG. 9. The energization of the memory set relay 90 applies a positive potential to a memory set line 92 through its own contacts 90a and 90b. The memory set line 92 is connected to the memory relay 88 in each counting stage wherein the register relay 86 is energized. These connections are made through register relay contacts 86d and 86e. Thus, each memory relay 88 connected to the memory set line 92 will be energized during the time of the "0" bit in the third out station reporting message. When the distributor stepping switch 66 advances to the "1" position, the energization circuit for the memory set relay 90 through the "0" position switch contacts on distributor deck D is broken and the memory set relay drops out. The de-energization of memory set relay 90 applies the positive potential on memory set relay contact 90a to a memory hold line 94 through memory set relay contact 90c. The memory set relay transfer contacts 90a, 90b and 90c are make-before-break contacts so that the positive potential is applied to the memory hold line 94 before the same potential is removed from the memory set line 92. This allows a holding circuit through memory relay contacts 88a and 88b to be established before the energizing potential is removed from register relay contacts 86d and 86e.

At this point, it will be helpful to briefly summarize the situation in the out station register 30. The odd numbered register relays 86 corresponding to the odd numbered bits in the incoming message are energized, as are their corresponding memory relays 88, while the even numbered register relays 86 and their corresponding memory relays 88 are de-energized. This condition represents a normal out station message and will continue until the binary value of one or more bits in the out station message changes.

The creation of a discrepancy between the count held by a register relay 86 and its corresponding memory relay 88 can easily be explained by pursuing the previous example of navigational lights at a relay station. Let us assume that the navigational lights have just turned off at sunrise and that the next incoming message from the out station will reflect this change in status of the navigational lights by a change in the binary value of the "1" bit from ONE to ZERO. As mentioned previously, the incoming out station message will be received by the central station receiver 26 and demodulated to a series binary pulse train in which the binary value ONE is represented by a positive direct current potential and the binary value ZERO is represented by a negative direct current potential. It can be seen therefore that when the distributor rotary switch 66 steps to the "1" switch position on deck A (FIG. 2), a negative potential will be applied to the "1" bit register relay causing that relay to drop out. The de-energization of the register relay breaks the previously established holding path through relay contacts 86a and 86b and applies a positive potential to line 96 through register relay contacts 86a and 86c. The appearance of a positive potential on line 96 indicates that a discrepancy has occurred between the binary count of incoming "1" message bit and the binary count of the previous "1" message bit which is held in the "1" bit memory unit relay. Since the corresponding memory relay 88 is energized at this moment, the positive potential on line 96 is applied to the discrepancy bus 42 through memory relay contacts 88d and 88e.

It has already been mentioned that one of the objects of the slow data area telemetering system 10 is to provide teletype recording of out station messages only if a discrepancy occurs between the incoming out station report and the previous out station report. The accomplishment of this objective will now be described in connection with the description of the central station collector 44 shown in FIG. 5.

COLLECTOR

The basic component of collector 44 is a 30-position rotary stepping switch 98 having six independent "decks" which are identified by Roman numerals I through VI to distinguish the collector decks from the alphabetically identified decks in the distributor rotary switch 66. Decks I through IV are used, respectively, to sequentially read out the count of the four out station registers 30, 34, 36 and 38. Collector decks V and VI provide switching functions for the station checking and remote control operations of the slow data rate telemetering system as will be described hereinafter.

Referring to FIGS. 2 and 4, with the "1" bit register relay de-energized by the negative direct current potential representing the binary count of ZERO, the discrepancy bus 42 will remain connected to a positive potential through the register relay contacts 86a and 86c. The positive or discrepancy potential on discrepancy bus 42 is applied to a collector start relay 100 whose energization circuit is completed at the end of the message distribution cycle through switch position "15" on deck A of the distributor stepping switch 66 and the sequencing relay contacts 68d and 68e. The energization of collector start relay 100 closes four pairs of normally open collector start relay contacts, two of which are shown in FIG. 2 and identified by the reference numerals 100a, 100b, 100c and 100d. The collector start relay contacts 100a and 100b establish a holding path for the collector start relay 100 after the distributor rotary switch 66 steps beyond swtich position "15." The second pair of collector start relay contacts 100c and 100d apply a positive potential to a paper punch magnet 102 which first advances a teletype paper tape (not shown) and then energizes a collector magnet 104 which provides the stepping action for the collector rotary stepping switch 98.

The actuating circuits for the paper punch magnet 102 and collector magnet 104 are shown in greater detail in FIG. 6. The positive potential for energizing the paper punch magnet 102 is obtained from collector start relay contacts 100c and 100d and applied to the paper punch magnet 102 through three sets of transfer contacts 106, 108 and 110. The first set of transfer contacts 106 is mechanically actuated by a cam 112 positioned on the shaft (not shown) of the collector rotary stepping switch 98. The set of transfer contacts 106 is shown in FIG. 6 with the collector rotary stepping switch in the "0" collector switch position with transfer contacts 106a and 106b closed. These contacts are closed only in the "0" position; in all other collector switch positions, the cam 112 closes contacts 106a and 106c thereby providing another source of positive potential for energizing both the paper punch and collector magnets 102 and 104, respectively.

Assuming that the collector rotary stepping switch is in "0" position as shown in FIG. 6, the positive potential from collector start relay contacts 100c and 100d will be applied through transfer contacts 106b and 106a, collector magnet transfer contacts 108b and 108a and paper punch magnet contacts 110a and 110b to the paper punch magnet itself. The initial energization of the paper punch magnet 102 advances the teletype paper tape (not shown) and closes the paper punch magnet transfer contacts 110a and 110c thereby applying a positive potential to the collector magnet 104. The energization of the collector magnet steps the collector rotary switch 98 one switch position from "0" to "1" and transfers pole contact 108a from transfer contact 108b to transfer contact 108c thereby interrupting the energization circuit for the collector magnet 104. With the collector rotary stepping switch 98 in position "1," cam 112 closes transfer contacts 106a and 106c which completes the energization path for the paper punch magnet 102 through transfer contacts 108a, 108b, 110a and 110b. The alternating energization of the paper punch and collector magnets will continue until the collector rotary stepping switch 98 reaches the "0" position at which time cam 112 will open transfer contacts 106a and 106b thereby breaking the energization circuit for both the collector and paper punch magnets.

The operating speed of the collector 44 can be varied within certain predetermined limits established by the information handling rate of the telemetering system. In the preferred embodiment the collector rotary stepping switch 98 rotates at least twice as fast as the distributor rotary stepping switch 66 to insure that the collector cycle will be completed before the end of the next incoming out station report. However, if the out station reports are separated by time intervals during which the telemetering channel is used for other purposes, the collector can be operated at a slower speed than the approximate 15 steps per second speed of the collector rotary switch 98.

Figure 5:
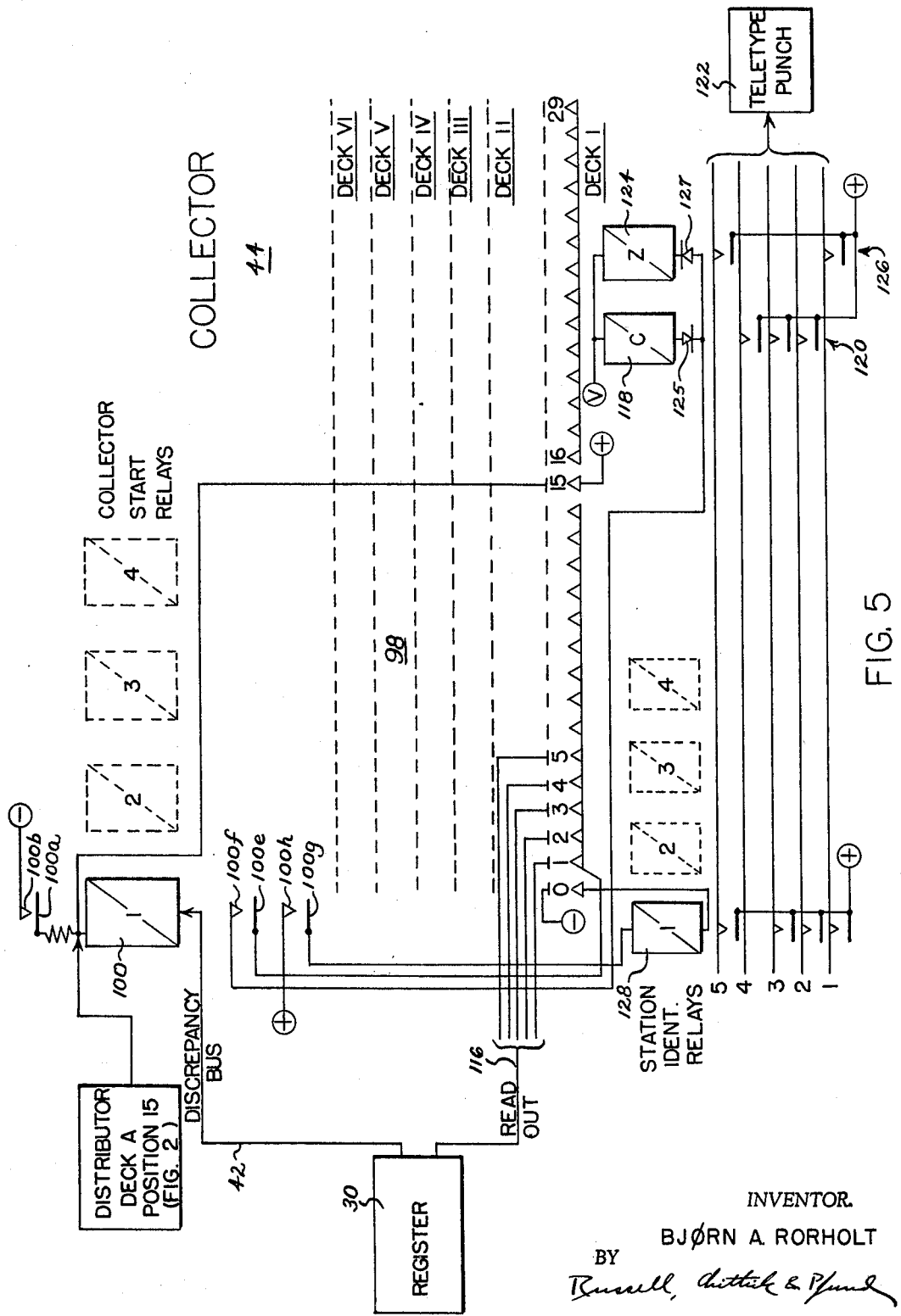
FIG. 5 is a partial schematic and block diagram of a telemetering system collector showing the teletype actuating circuits thereof.

Turning now to the schematic and partial block diagram of the collector rotary stepping switch 98 depicted in FIG. 5, it will be apparent that the collector deck I switch position "1" contacts are connected to the corresponding first bit register relay in register 30 when the collector rotary stepping switch 98 is in position "1." It should be remembered that the change in the binary value of the first message bit from ONE to ZERO caused the de-energization of the first bit register relay 86 which in turn applied a positive potential to the discrepancy bus 42 through the register relay contacts 86a and 86c. Since register relay contact 86c and line 114 are now disconnected from the source of positive potential, the potential on the first bit register stage readout line 115 will be negative. A negative potential on any one of the register readout lines, collectively identified by the reference numeral 116, indicates a discrepancy or "fault" condition for the corresponding out station message bit.

This potential is used to energize a "fault" relay 118 through the circuit established by the closed switch position "1" contacts on deck I of the collector rotary switch 98 and collector start relay contacts 100e and 100f. The energization of "fault" relay 118 closes normally open "fault" relay contacts 120 which apply a positive potential to the input leads "2," "3" and "4" to a teletype paper punch 122. In standard 5-bit teletype code, the "fault" relay 118 sets up the teletype characters (space, mark, mark, mark, space) for the letter "C" and the colon punctuation mark ":." While either symbol can be used to indicate the presence of a discrepancy in the slow data rate system, in the preferred embodiment the printer is operated in "upper case" to provide a nonalphabetical record of the discrepancy status of the telemetering system, i.e., a colon ":" indicates a discrepancy while a quotation mark (") represents a "normal" condition.

The generation of the "normal" condition mark (") will now be explained. Referring to FIG. 5, a corresponding "normal" relay 124 is connected in parallel with "fault" relay 118 so that if the bit readout from register 30 is a positive potential, i.e., "normal," the "normal" relay 124 will be energized through the same circuit as the "fault" relay 118. The energization of the "normal" relay 124 closes normally open relay contacts 126 which apply a positive potential to the first and fifth input lines to the teletype paper punch 122. These potentials or signals, i.e., (mark, space, space, space, mark), represent the teletype letter "Z" and the quotation mark (").

The "fault" and "normal" relays are electrically isolated by oppositely poled blocking diodes 125 and 127 which are serially connected to relays 118 and 124, respectively. It can be seen that both relays are connected to a common source of potential indicated by the letter "V" in FIG. 5. The potential "V" is voltage which is halfway between the positive "normal" potential and the negative "fault" potential mentioned above. It should be understood that the terms "positive" and "negative" as used herein are, of course, relative and can be reversed without departing from the scope of the present invention.

It should be noted that the "fault" indication will be recorded only if one stage of the register 30 contains a discrepancy. If all stages of the register hold the same count as the incoming out station message, no discrepancy will occur and therefore no positive potential will be applied to the discrepancy bus 42 to initiate the collector cycle.

The teletype characters for letters "C" and "Z" (upper case colon and quotation mark, respectively) are used in the slow data rate telemetering system to indicate faulty or normal out station conditions because the teletype characters for each letter are the exact inverse of each other, i.e., (space, mark, mark, mark and space) and (mark, space, space, space and mark). The inverse relationship of the "fault" and "normal" teletype characters reduces the possibility of recording an erroneous out station condition and at the same time provides system self-checking because the recording of any teletype character other than "C" or "Z" in the out station message portion of the teletype recording indicates a malfunction in the telemetering system.

It has been stated previously that one of the features of the present invention is to provide station identification marks on the teletype recording to indicate which out station message contained the discrepancy or discrepancies. These teletype marks are obtained by means of station identification relays 128 which are shown in FIG. 5. By energizing the appropriate station identification relay 128, a positive potential will be applied to the teletype paper tape punch 122 through one or more of the five teletype input leads. If it is assumed that the discrepancy or discrepancies occurred in the reporting message from the first out station, then the #1 station identification relay 128 will be energized by the first out station collector start relay 100 through contacts 100g and 100h. Since it is usually preferable to have the station identification appear on the teletype paper tape (not shown) before each recorded out station message, the energization circuit for the #1 station identification relay 128 is completed when the collector rotary stepping switch 98 is in the "0" position. Obviously, the station identification mark can be recorded at the end of the out station message by utilizing position "29" instead of position "0" on deck I of the collector rotary switch 98.

Assuming that the proper station identification mark has been printed at the beginning of the out station recorded message and, further, that the collector rotary stepping switch 98 has stepped through positions numbered "0"–"14," when the collector rotary stepping switch reaches position "15," the energized #1 collector start relay 100 is tripped by applying a positive potential through collector switch position "15" to the holding side of the energized collector start relay. The de-energization of the collector start relay 100 disconnects the "fault" and "normal" relays 118 and 124, respectively, from the collector rotary stepping switch 98 by opening collector start relay contacts 100e and 100f. The remaining fifteen switch positions on deck I of the collector rotary stepping switch 98 are used to provide switching control of other operations including the recording of date/time marks on the teletype paper tape (not shown). The generation of the teletype date/time marks will now be described.

TIME MARK GENERATOR

Figure 8A:
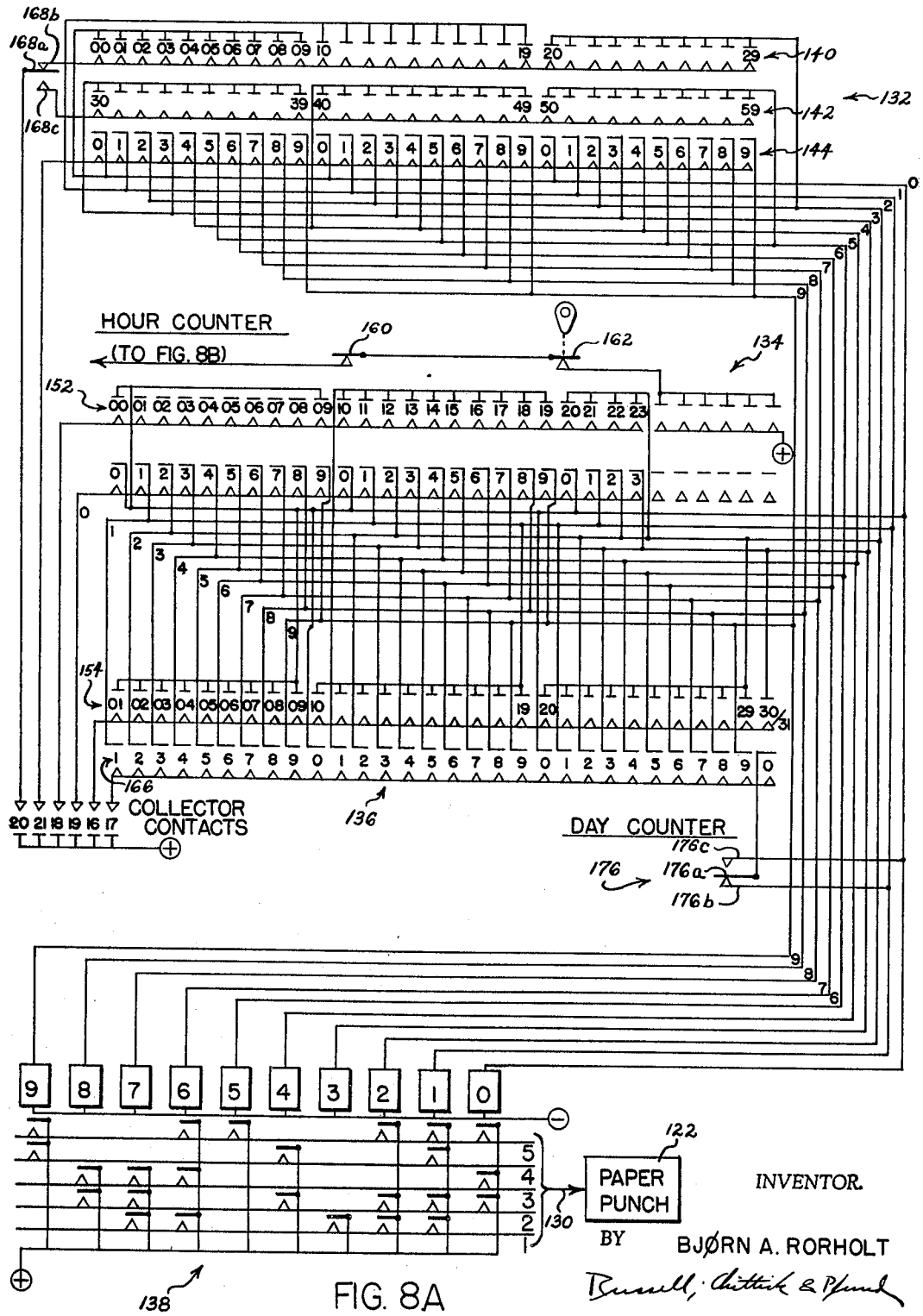
FIGS. 8A and 8B are partial schematic and block diagrams of a time mark generator.
Figure 8B:
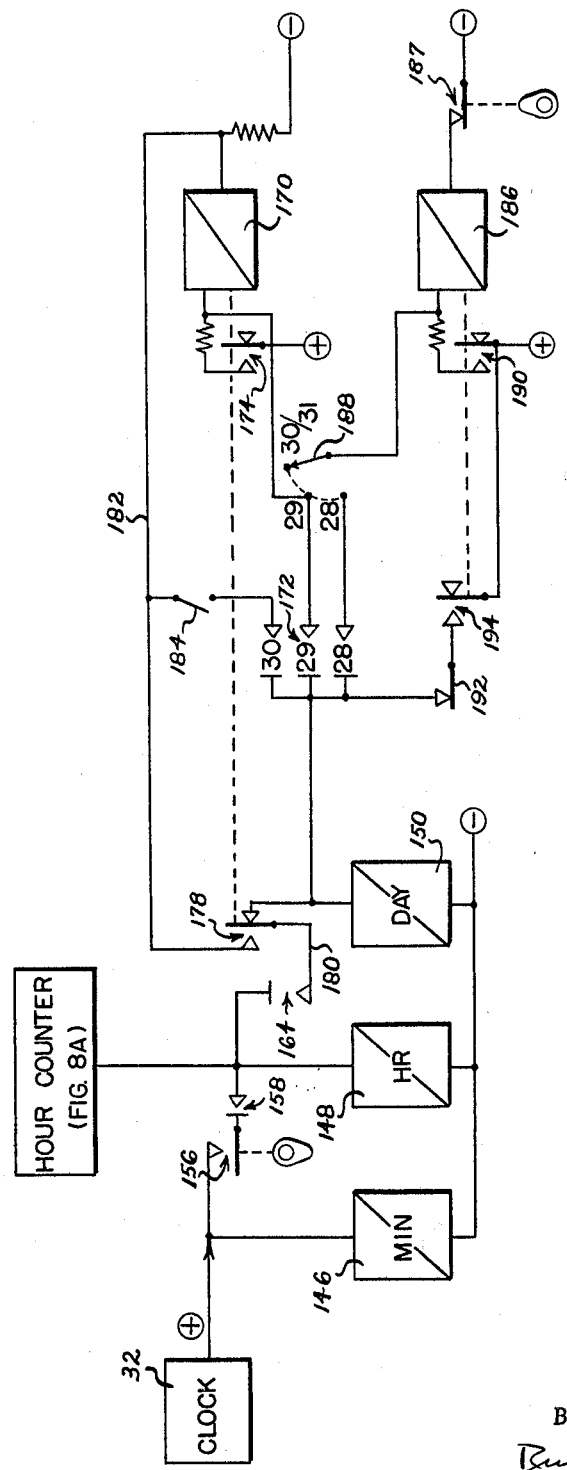

The time mark generator 48, shown in partial schematic and block diagram form in FIGS. 8A and 8B, produces teletype coded time marks in the form of parallel signals on five separate output leads, collectively identified by the reference numeral 130, which are connected to the teletype paper punch 122 depicted in FIG. 5. If a serial time signal is desired, an additional parallel-to-series converter (not shown) can be inserted in the output leads 130 between the time mark generator 48 and any utilization equipment.

The time mark generator 48 comprises three rotary stepping switches 132, 134 and 136 (FIG. 8A), their associated actuating circuits (FIG. 8B) and ten Number relays 138 (FIG. 8A). The three rotary stepping switches provide, respectively, the "minute," "hour" and "day" signals for the teletype punch 122 or similar equipment. The construction of the three time mark stepping switches 132, 134 and 136 is similar to that of the distributor and collector stepping switches 66 and 98, respectively, in that each time mark stepping switch has six independent switching "decks" containing thirty switch positions per deck.

It is not necessary to use all six decks of any one switch to generate the applicable minute, hour or day marks. Referring to FIG. 8A, it can be seen that only two decks are used in the hour and day rotary stepping switches 134 and 136, respectively. However, three decks are required in the minute rotary stepping switch 132 to cover the sixty positions corresponding to the sixty "minute" time marks. The three decks in minute stepping switch 132 are identified by the reference numerals 140, 142 and 144. The minute deck 140 is used during the first revolution of the "minute" rotary stepping switch 132 and provides the most significant digit time mark for minutes "00" through "29." The second deck 142 of the minute rotary stepping switch 132 is actuated during the second revolution of the stepping switch and provides the most significant digit time mark for minutes "30" through "59." The least significant digit time mark for minutes "00" through "59" is provided by the third deck 144 on the minute rotary stepping switch 132.

The three time mark generator rotary stepping switches are electromagnetically actuated by corresponding "minute," "hour" and "day" electromagnets 146, 148 and 150, respectively, which are shown in FIG. 8B. The timing or energizing pulses for the three electromagnets are obtained from the master clock 32 which supplies pulses at one minute intervals to the "minute" electromagnet 146. At the end of the fifty-ninth minute, the next clock pulse actuates the "hour" electromagnet 148 and, similarly, at the end of the fifty-ninth minute in the twenty-third hour, the next clock pulse actuates the "day" electromagnet 150.

The generation of time marks by the time mark generator 48 can best be understood by examining the operational sequence for a given date and time. If it is assumed that the out station discrepancy occurred on the fifth day of the month in the thirteenth hour and at the fifty-seventh minute, then the time mark generator 48 will produce sequential time mark signals which will cause the teletype paper punch 122 to punch the teletype characters corresponding to the numerals 051357. This six digit number represents the date and time of the discrepancy expressed in the familiar twenty-four hour military date/time group. Although the date precedes both the hours and minutes in the six digit date/time group, the actual generation of the corresponding signals by the time mark generator 48 is performed in the reverse order because both the hour and day electromagnets 148 and 150, respectively, are ultimately controlled by the action of the minute rotary stepping switch 132. In order to simplify the description of the operation of the time mark generator 48, the minute-hour-day sequence will be employed in the following discussion.

The minute rotary stepping switch or minute counter 132 is stepped once each minute by the action of electromagnet 146 which is energized by master clock pulses at one minute intervals. Since the discrepancy in the above example occurred in the fifty-seventh minute, the minute counter 132 will have stepped through fifty-seven positions comprising one complete revolution of the minute counter (positions "00" through "29") and a portion of a second revolution (positions "30" through "57"). Thus at the time of the discrepancy, the minute counter 132 will be in position "57" on deck 142.

The hour switch or hour counter 134 will, of course, be in the "13" position on deck 152 and the day switch or day counter 136 will be in the "05" position on deck 154. The action of the hour and day counters can be explained briefly as follows: whenever the minute counter contact "59" on deck 142 is closed, the next succeeding clock pulse from master clock 32 will be applied to the "hour" electromagnet 148 through series connected contacts 156 and 158. Contacts 158 are closed each time the minute counter 132 is in position "59," however, since contacts 156 are closed only during the second revolution of the minute counter, the hour counter 134 will step forward one step at the end of each hour. At the end of the twenty-third hour, the hour counter 134 closes its own auto-step contact 160 (FIG. 8A) and continues stepping until it reaches the "00" hour position at which time the auto-step circuit is broken by a series connected cam-actuated switch 162. When the hour counter 134 is in the "23" position, the next hourly pulse, i.e., the "00" minute pulse through contacts 156 and 158 will also actuate the "day" electromagnet 150 via contacts 164 which are closed only in the "23" position of the hour counter 134.

Figure 7:
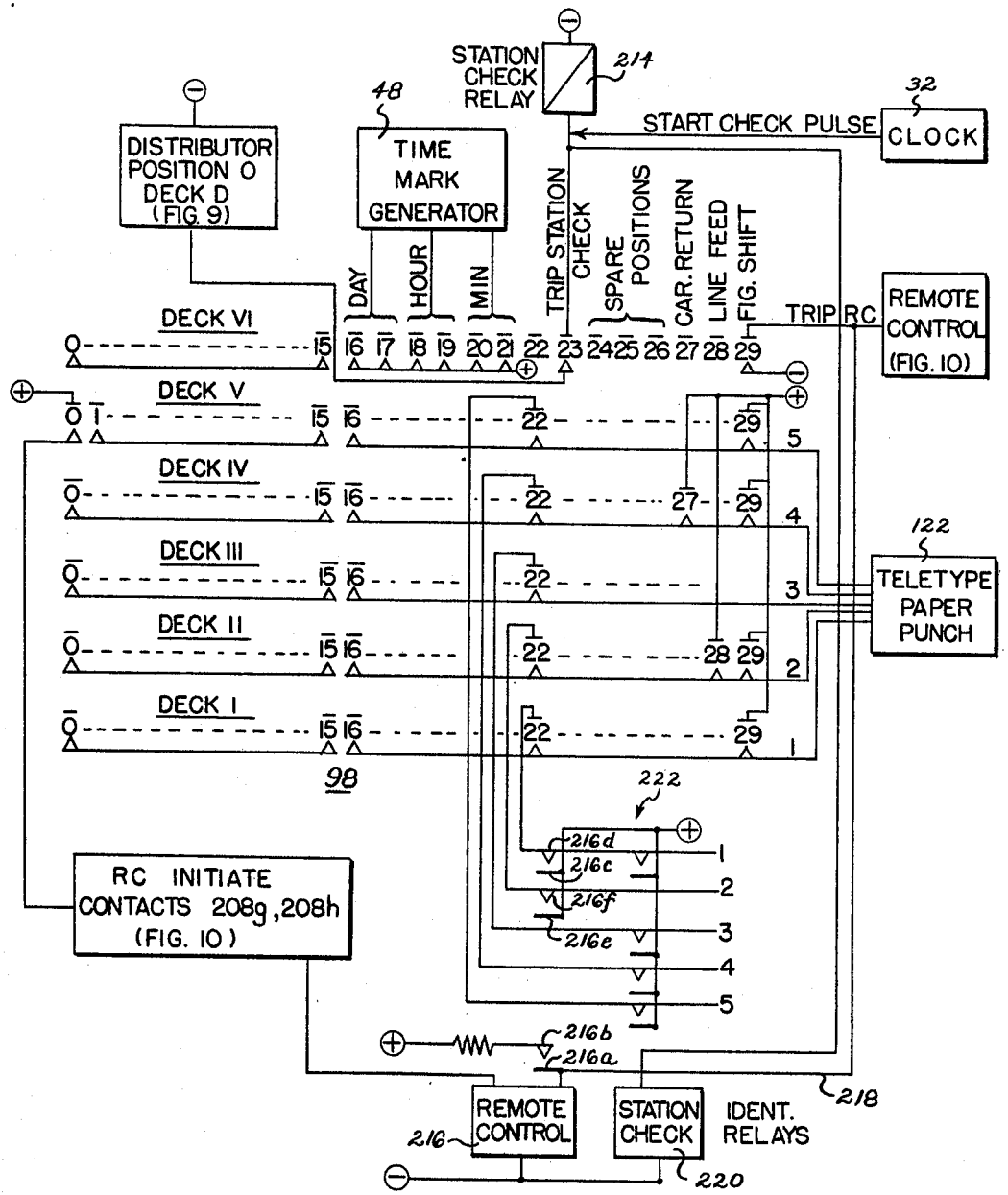
FIG. 7 is a partial schematic and block diagram of the collector showing the time mark remote control and station checking portions thereof.

Assuming now that the day, hour and minute counters are in the switching positions representing 051357, the appropriate circuits will be energized sequentially by contacts "16" through "21" on deck VI of the collector rotary switch 98, as shown in FIGS. 7 and 8A. When the collector switch 98 is in position "16," a positive potential is applied to deck 154 on the day counter 136 and from this deck to the "0" output line through the now closed "05" contacts. The presence of a positive potential on the "0" output line energizes the corresponding "0" Number relay 138 thereby applying a positive potential to the second and fifth time mark generator output leads 130 which causes the teletype paper punch 122 to punch the teletype characters representing the numeral "0." The second digit of the date, i.e., "5," is punched on the teletype paper tape (not shown) in essentially the same way when the collector switch 98 advances to position "17." However, in this situation position "5" on day counter deck 166 is used to energize the corresponding "5" Number relay 138.

In the same way, the hourly digits "1" and "3" and minute digits "5" and "7" are punched on the teletype paper tape (not shown) when the collector switch 98 is in positions "18," "19," "20" and "21." It should be noted in connection with the minute time marks, that only the switch positions defined by contacts "57" on deck 142 and "7" on deck 144 are utilized. If the minute digits were between "00" and "29" inclusive, decks 140 and 144 would be used instead. The switching of the positive potential from collector rotary switch position "21" to either of the minute counter decks 140 and 142 is accomplished by cam-actuated transfer contacts 168a, 168b and 168c. During the first revolution of the minute counter 132, the center contact 168a applies the positive potential to deck 140 through transfer contact 168b. As the minute counter 132 rotates from position "29" back to position "0" (position "30" on deck 142), a cam (not shown) transfers contact 168a from contact 168b to contact 168c thereby switching the positive potential from deck 140 to deck 142 during the second revolution of the minute counter 132.

The time mark generator 48 can accommodate variations in the length of the calendar month from 28 through 31 days. For a month with 30 days, the cycle of the day counter rotary switch 136 is as follows: at the beginning of the thirtieth day, relay 170 (FIG. 8B) is energized through a separate "29" position contact 172 (FIG. 8B) on the day counter stepping switch 136. Relay 170 has three sets of single pole, two position transfer contacts identified by the reference numerals 174, 176 and 178. The first set of transfer contacts 174 creates a holding path for relay 170 while the second set of transfer contacts 176 (FIG. 8A) provides either a "30" or "31" output for the corresponding Number relays 138. Referring to FIG. 8A, transfer contact 176 is shown in its de-energized or "31" output position. When relay 170 is energized through contact 172 (FIG. 8B), the center contact 176a will be transferred from contact 176b to contact 176c thereby providing a "30" output.

The third set of transfer contacts 178 (FIG. 8B) disconnects the day counter electromagnet 150 from input line 180 and establishes a trip relay line 182 for relay 170. If the series connected "30 day" switch 184 is closed, the next trigger pulse on input line 180 twenty-four hours later will trip relay 170 and actuate the day counter electromagnet 150 thereby returning the day counter 136 to the "01" position. A thirty-one day month is obtained essentially as described above, but the "30 day" switch 184 is left open. Thus when next trigger pulses arrive on input line 180, the relay 170 will be tripped, as noted above, however, the day magnet 150 will not be actuated because of the open switch 184. The de-energization of relay 170 will change the output to "31" on transfer contacts 176 (FIG. 8A) and also will connect the trigger input line 180 back to the day electromagnet 150 so that the next time electromagnet 150 gets a trigger, it will step the day counter 136 to the first of the next month.

Month lengths of twenty-eight and twenty-nine days are achieved by using a "February" relay 186 (FIG. 8B) which will produce twenty-eight or twenty-nine day cycle lengths depending upon the setting of a single pole three position switch 188. If switch 188 is set to the "28" position, the "February" relay 186 will be actuated through an extra "28" contact when the day counter switch 136 receives a clock pulse at the end of the twenty-eighth day. The energization of "February" relay 186 establishes a holding path through contacts 190 and energizes an auto-step contact 192 (or self-breaker) through contacts 194 which causes the day counter switch 136 to step forward to the first of the next month. If switch 188 is set to the "29" position, the same events will occur when the day counter switch 136 steps to position "30" on receiving a clock pulse at the end of the twenty-ninth day. The "February" relay 186 is tripped by a cam actuated switch 187 which is open in the "01" day position of the day counter rotary switch.

The time mark generator 48 can be modified to provide a monthly counter if this is needed in a particular telemetering system application. The instrumentation of the month counter is relatively simple and requires only the addition of a fourth step switch which counts two times twelve months on each deck and uses two decks to count four years. In the modified time mark generator the month counter replaces the "length-of-month" switch 188 and automatically connects the day counter 136 in accordance with the actual month. Every fourth year, the month counter connects the "February" relay 186 to switch position "29" instead of "28," thus taking care of the leap years.

The slow data rate telemetering system 10 can be further modified to eliminate the separate station identification relays 128 shown in FIG. 5. Since the time mark generator Number relays 138 (FIG. 8A) provide the necessary teletype characters for any combination of numbers, these relays also can be used as station identification relays.

AUDIO REPRODUCTION

The circuitry for providing an audio reproduction of the incoming binary telemetered message from each out station is shown in partial schematic and block diagram form in FIG. 9. The operation of the audio reproduction circuitry and its relationship to the telemetering system as a whole can best be understood by viewing FIG. 9 in connection with the system block diagram shown in FIG. 1 and the detailed register circuitry depicted in FIG. 4.

It has already been mentioned that the purpose of the audio reproduction circuitry is to provide a rhythmic aural indication of the incoming binary message so that any changes from a preselected rhythm will be detected by the system's monitoring personnel. In the preferred embodiment of the invention, an alternating rhythm of seven tones or "pips" separated by seven corresponding intervals of silence comprises a "normal" reporting message. It has been found that this type of tonal rhythm provides an unobtrusive background sound pattern which does not disturb the normal activities of the monitoring personnel, yet any departures from the predetermined "normal" rhythm will be recognized immediately by the monitoring personnel.

The ability of the human sensory system to relegate a familiar noise or tonal pattern to the subconscious level while still responding at the conscious level to any changes in the noise or tonal pattern is well known. For example, on shipboard where machinery noises and vibrations are the normal operating conditions any change in a familiar noise and/or vibration pattern will invariably cause a momentary pause in the thoughts of the ship's personnel and an awareness that something is wrong or unusual. Similarly, during wartime, a ship's safety to a large extent was dependent upon the ability of its bridge personnel to detect any shift in the steady, monotonous pinging of the ship's sonar equipment. The constant frequency of the sonar ping represented the normal condition and, as such, was only half heard, yet a single "up doppler" echo return was sufficient to alert the entire bridge personnel. This sensory response characteristic is used in the audio reproduction circuitry of the slow data rate binary telemetering system to provide a simple and relatively inexpensive warning system for out station changes and malfunctions.

In its simplest instrumentation, the audio reproduction circuitry comprises the audio oscillator 54 and loud speaker 56. Since the "normal" out station message comprises seven tones or "pips" sequentially alternating with intervals of silence, i.e., seven bursts of the out station carrier frequency, the audio oscillator 54 can be keyed directly by the demodulated binary waveform from the central station receiver 26. This circuit configuration is adequate to alert the central station monitoring personnel to a shift in the tonal rhythm caused by a change in the binary value of one or more bits in the out station message. Frequently, however, the binary value of one or more bits in an out station message will change at cyclic intervals which merely represent a shift from one normal out station condition to another. In this situation, it is desirable to provide a means for "correcting" or "righting" the audio keying signals so that the audio oscillator 54 will produce a normal seven tone signal even though the out station message no longer comprises the "normal" seven bursts of carrier frequency.

The audio "righting" portion of the audio reproduction circuitry is shown in FIGS. 4 and 9. Referring to FIG. 4, the audio output signals from each stage of the first out station register 30 are coupled through leads 60 to corresponding switch positions "1–14" on deck C of the distributor rotary switch 66 (FIG. 9). As the distributor switch rotates in time synchronism with the incoming out station message, the distributor switch positions "1–14" are sequentially connected to the audio oscillator 54 through contacts 68f and 68g on the sequencing relay 68. Note that sequencing relay contacts 68g and 68h perform the same switching function during the second revolution of the distributor switch.

If it is assumed for purposes of illustration that the audio oscillator 54 is keyed only by a positive potential on line 52, then the oscillator keying waveform for a normal out station message will comprise a serial pulse train of positive and negative pulses with the positive pulses occurring during the odd numbered message bits. The sequentially alternating, opposite poled oscillator keying potentials are obtained by alternating the audio output connections to the fourteen stages of register 30. In FIG. 4, it can be seen that the audio output leads 60 are connected in alternating sequence to the "1" and the "0" leads of the fourteen register stages. The designations "1" and "0" represent, in binary form, the positive and negative voltages appearing on each of the respective leads. Since the distributor rotary switch 66 is connected sequentially to each stage of register 30, the resulting audio oscillator input waveform will comprise seven positive pulses during the odd numbered message bits and seven negative pulses during the even numbered bits.

It will me readily apparent that other rhythmic tonal patterns can be established either initially by connecting the audio output leads to the appropriate "1" or "0" leads in each register stage or at a subsequent time by means of switches, such as, the audio reverse switches 58 which will now be described.

The double poled, double throw audio reverse switches 58 depicted in FIG. 4 are provided in the audio reproduction circuitry to permit polarity reversal of the audio output signals from any preselected stage or stages in register 30. If the binary value of one or more bits in the out station message changes because of a shift from one normal or acceptable out station operating condition to another equally normal or acceptable condition, there will be a corresponding shift in the tonal pattern produced by the audio oscillator and loud speaker. Thus, although the change in the out station message is normal, the resulting tonal rhythm indicates an abnormal condition. The normal tonal pattern can be restored by "righting" the audio output signal from the affected stage or stages in register 30. This is accomplished by throwing the appropriate audio reverse switch or switches 58 which reverse the binary value of the "1" or "0" leads, i.e., reverse the polarity of the audio output signals so that the original seven tone rhythm can be restored despite any changes in the out station reporting message.

It should be noted that the audio "righting" facilities of the present invention can be used in situations other than that described above where the change in the binary value of one or more bits merely indicates a shift from one normal state to another. For example, assuming that a malfunction occurs in a portion of the out station equipment which is monitored by one of the out station data sensors 24, the malfunction will cause a change in the binary value of the corresponding message bit, e.g., from "1" to "0" if the particular message bit was an odd numbered bit. Since the out stations are normally located in physically isolated places, the malfunction cannot be corrected immediately and, hence, each subsequent reporting message from the malfunctioning out station will contain a discrepancy which alters the tonal pattern produced by loud speaker 56. If another malfunction should occur in the affected out station, the resulting change in tonal pattern might not be detected by the operating personnel because they have become adjusted to hearing an abnormal tonal pattern during the reporting cycle of the malfunctioning out station. The chances of the monitoring personnel not detecting the second malfunction can be reduced appreciably by using the appropriate audio reverse switch 58 to restore the tonal pattern to the normal seven "pip" rhythm after the first malfunction has been recorded. When the second malfunction occurs, the change in tonal pattern will be an easily detected shift from a normal rhythm to an abnormal rhythm rather than merely a change from one abnormal rhythm to another.

VISUAL DISPLAY

The telemetering system visual display, indicated by reference numeral 62 in FIGS. 1 and 4, is coupled to register 30 to provide a visual readout of the register count. A separate visual display can be provided for each out station in the telemetering system or the individual out station displays can be combined in a single display installation depending upon the monitoring requirements of the particular system. The visual display 62, as shown in FIG. 4, comprises a pair of red and green lamps 196 and 198, respectively, for each stage of register 30. A normal out station message of seven carrier bursts separated by equal intervals of no carrier transmission is represented by an all "green" indication on the visual display 62. The all "green" indication is obtained by connecting the green lamps 198 to the positive or "1" lead from the corresponding register stage.

If the binary value of any bit in the out station reporting message changes, the corresponding visual display will change from green to red. This action can be seen by examining the operational sequence of the first bit register relay 86 in register 30. Since the first bit in a normal reporting message is a mark, the corresponding first bit register relay 86 is energized and will remain energized through its holding contacts 86a and 86b until the binary value of the first bit changes from "1" to "0." As long as the first bit register relay remains energized, a positive potential is applied to the "green" lamp 198 through lead 114, discrepancy reverse switch 50 and the audio reverse switch 58. However, when the first bit register relay 86 de-energizes, the positive potential is transferred from lead 114 to lead 96 by the action of contacts 86a and 86c thereby illuminating the red lamp 196 representing the first bit on the visual display 62.

If the change in the binary value of the first bit in the out station reporting message merely indicates a shift from one normal condition to another, the appropriate audio reverse switch 58 can be thrown, as described above, to correct the sound pattern emitted by loud speaker 56. The red and green display lamps 196 and 198, respectively, for each register stage are wired to the corresponding audio reverse switch so that the visual display will be "righted", i.e., changed from "red" to "green" whenever the audio reverse switch is activated to correct the audio rhythm.

It should be noted that if the audio reverse switches 58 are employed to correct the effect of a true malfunction as opposed to a change between two "normal" operating conditions, it may be desirable to have a continuous visual indication of the malfunction even though the aural pattern and visual display have been corrected by the action of the audio reverse switches 58. For this purpose, a malfunction lamp 200 can be connected to the de-energized or "0" lead in each stage of the register 30 at a point between the corresponding register relay 86 and the audio reverse switch 58 as shown in FIG. 4. The illumination of any one of the lamps 200 will indicate that a malfunction has occurred in the out station. The malfunction lamp will remain illuminated until the binary value of the associated message bit returns to normal indicating that the malfunction at the out station has been corrected.

Other modifications can be made in the audio reproduction and visual display circuitry without departing from the scope of the invention. For example, separate audio and visual reverse switches can be provided to permit the independent correction of either the aural rhythm or visual display or both.

REMOTE CONTROL

The remote control portion of the slow data rate binary telemetering system is depicted in FIGS. 7 and 10 which illustrate, respectively, the portions of the collector rotary switch 98 and the distributor rotary switch 66 which perform the necessary switching functions for the remote control mode of operation. Two decks of the distributor stepping switch 66 are employed to provide remote control operation of the four out stations. On deck E (FIG. 10) switch positions "0–14" and "15–29" are used for the remote control of the first and second out stations, respectively, while the corresponding switch positions on deck F provide the necessary remote control switching functions for the third and fourth out stations. In order to simplify the schematic and block diagrammatic presentation of the remote control circuitry, only the circuitry associated with the remote control of the fourth out station is shown in FIG. 10.

It has already been explained in connection with the block diagram of FIG. 1 that the remote control message keys the remote control portion of the central station transmitter 16 and inhibits the transmission of the reporting message from the remote control out station. The remote control message also can be transmitted by a separate local or remote transmitter if the telemetering system requirements dictate such a configuration. In order to simplify the following description of the remote control mode of operation, any transmitter which transmits a remote control message will be referred to hereinafter as "the remote control transmitter" and will be identified by the reference numeral 202.

The telemetering system remote control message comprises fifteen bits which can be divided into groups according to their respective functions. The first bit, i.e., bit "0" of a remote control message consists of a "mark" which prevents the transmission of the out station report and opens up the remote control portion of the out station receiver 18. The next seven remote control message bits, i.e., 1 through 7, contain the actual remote control message which is then repeated in inverted binary form during message bits 18 through 14 to provide full message duplication. Each out station is instrumented so that it will perform the desired remote control operations only if both halves of the remote control message check bit-for-bit. The out station remote control circuitry has not been depicted in the figures nor described herein because the appropriate circuitry is well known to those skilled in the art.

The desired remote control message for the fourth out station is manually set up at the central station by means of seven "locking" type remote control push buttons 204 (FIG. 10). The remote control push buttons 204 operate corresponding sets of transfer contacts, indicated generally by the reference numeral 206, which are connected to switch positions "16–29" on distributor deck F. From an inspection of FIG. 10, it can be seen that the transfer contacts 206 establish the inverse binary relationship between remote control message bits 1 and 8, 2 and 9, etc. In order to illustrate this relationship, switch positions "16–29" on deck F have been labeled "1 through 7" and "1 through 7."

Once the remote control message has been set up on the remote control buttons 204, remote control of the fourth out station is initiated by depressing a "remote control initiate" button 208. Actuation of the remote control initiate button 208 closes contacts 208a and 208b thereby applying a positive voltage from line 210 to switch position "15" on distributor deck F and to a remote control indicator lamp 212. The positive voltage on line 210 is obtained via contacts 214a and 214b on station check relay 214. Assuming that the distributor rotary switch is at the beginning of its second rotation, i.e., at the beginning of the third out station reporting cycle, the sequencing relay 68 (FIG. 10) will be energized and the sequencing relay contacts 68i and 68k will be closed thus completing a keying path from distributor switch station "15" on deck F through the aforementioned sequencing relay contacts and the now closed, manually actuated remote control initiate contacts 208c and 208d to the remote control transmitter 202.

This path will, of course, remain de-energized until the distributor stepping switch 66 reaches position "15," at which time the positive keying voltage from line 210 is applied to the remote control transmitter 202. Since switch position "15" corresponds to the first or "0" bit in the reporting message from the fourth out station, the transmission of a "mark" by the remote control transmitter 202 during this period will inhibit the out station transmitter 20 and open up the remote control portion of the out station receiver 18. As the distributor rotary stepping switch steps through the next fourteen switch positions, the remote control transmitter 202 is keyed in accordance with the pattern previously established by remote control push buttons 204.

Whenever a remote control message is transmitted by the remote control transmitter 202, the message will be received by the central station monitoring receiver 26 in addition to the out station receivers 18. Since the remote control message will almost certainly be different from the last reporting message from the remote controlled out station, the remote control message will produce a discrepancy and, therefore, be recorded as previously described. However, to insure that the remote control message will be recorded in all instances, a separate set of contacts 208e and 208f on the remote control initiate button 208 are used to apply a positive voltage to the corresponding out station discrepancy bus.

At the end of the remote control message, the distributor rotary switch 66 steps from switch position "29" to switch position "0" thereby completing the energization path for the fourth collector start relay 100 through the "0" switch position on distributor deck A (FIG. 2). The energization of the fourth collector start relay 100 establishes a holding path for the relay through its own contacts 100a and 100b.

With the appropriate collector start relay 100 now energized, recording of the remote control message will proceed in the same manner as described previously with respect to an out station message. After the date and time marks have been recorded, a remote control identification mark is punched in the teletype paper to indicate that the previously recorded message was a remote control message. The circuitry for recording a remote control ID mark is shown in FIG. 7 wherein the necessary switching functions are provided by a remote control identification relay 216 and by switch positions "22" on collector decks I–V. The remote control relay 216 is initially energized when the collector stepping switch 98 is in the "0" position through the path established by the "0" position switch contacts on deck V of the collector (FIG. 7) and the closed remote control initiate contacts 208g and 208h (FIG. 10). The remote control identification relay 216 establishes its own holding path through contacts 216a and 216b so that the relay will continue to hold until the collector switch reaches position "29" at which point the remote control relay is tripped by applying a negative potential to line 218 through switch contacts "29" on collector deck VI (FIG. 7). The recording of the remote control identification mark occurs when the collector switch 98 reaches position "22." In this position a positive potential is applied to the teletype paper punch input lines "1" and "2" through remote control relay contacts 216c, 216d, 216e and 216f causing the teletype paper punch 122 to punch a "mark, mark, space, space, space."

Referring to FIG. 7, the switch positions "24, 25 and 26" on all six decks of the collector rotary switch 98 are spare positions and can be utilized for other control functions. Switch positions "27" on deck IV, "28" on deck II and "29" on decks I, II, IV and V are used to provide, respectively, carriage return, line feed and figure shift signals to the teletype paper punch 122. When the distributor returns to the "0" position, the remote control push buttons 204 and remote control initiate push button 208 are released either by electrical or mechanical means (not shown) depending upon the particular type of locking mechanism.

STATION CHECKING

Station checking circuitry is included in the slow data rate binary telemetering system to provide automatic station checking at preselected intervals. At the end of each selected interval, e.g., at the end of each hour, the master clock 32 sends a positive station checking pulse to the station check relay 214 (FIG. 10) and to a station check identification relay 220 (FIG. 7) causing both relays to operate. In its energized state, the station check relay 214 applies a positive potential to switch positions "0" and "15" on decks E and F of the distributor rotary switch 66 through station check relay contacts 214b through 214i. Contacts 214h and 214i also are used to establish a holding path for the station check relay.

The presence of a positive potential on decks E and F switch positions "0" and "15" will cause all out stations to block their reporting cycles because the remote control transmitter will be keyed to send an inhibition pulse for 150 milliseconds during the "0" bit of each out station reporting message. However, no other remote control message will be sent by the remote control transmitter 202. In other words, the out station and central station receivers 18 and 26, respectively, will receive "all blank" remote control messages. Since the central station registers 30, 34, 36 and 38 will all show an "all space" message, and since the "all space" message will certainly differ from the previous out station message held in the respective registers, a discrepancy will exist and the "all space" message will be recorded.

The "all space" message or period of "silence" can be utilized to perform a noise check at the central station to determine that demodulated noise from the telemetering channel does not produce a "mark" signal. Each out station is instrumented to send an "all mark" report during the next succeeding reporting cycle after receiving an "all blank" remote control message. The "all mark" message will be received, registered and recorded at the central station and can be used to check that the signal strength at the out station is sufficient to trigger the out station circuitry to produce an "all mark" reporting message. In addition, this check will also confirm that all relays in the central station registers are functioning properly and that the remote control path is intact. The remote control responsive circuitry in each out station has not been depicted in the drawings nor described herein because such circuitry is well known to those skilled in the art.

It was mentioned at the beginning of this section that the station checking pulse from the master clock 32 energized a station check identification relay 220 in addition to the station check relay 214. The operation of the station check ID relay 220 is essentially the same as that of the previously described remote control ID relay 216, and therefore, need not be discussed in detail. Briefly, the station check ID relay is energized by the clock pulse and held by the station check relay holding contacts 214h and 214i during the rotation of the collector switch 98. When the collector switch 98 reaches position "22" (FIG. 7), a station checking identification mark is recorded by applying a positive potential to the teletype punch input lines "1," "3," "4" and "5" through the appropriate station check IDENT, relay contacts, identified generally as 222.

When the collector rotary switch 98 reaches position "23," both the station check relay 214 and station check identification relay 220 are tripped by a negative potential obtained through the path established by switch contacts "23" on deck VI of the collector (FIG. 7) and the "0" position switch contacts on deck D of the distributor switch 66 (FIG. 9).

What I claim is:

1. In a time division, multiplexed, telemetering and data logging system having means for transmitting and receiving binary series signals, the improvement comprising: distributor means coupled to said receiving means for sequentially distributing said binary signals to a plural stage register having coupled thereto a corresponding plurality of memory units; a collector; means coupled to said collector for producing teletype signals; and, means responsive to a count discrepancy between one of said register stages and the corresponding memory unit for sequentially coupling said collector to said register stages.

2. The improvement of claim 1 wherein said teletype signal means includes means responsive to a predetermined binary count in each register stage for producing a first teletype signal and means responsive to each discrepancy from said predetermined count for producing a second teletype signal.

3. The improvement of claim 2 further characterized by said first and second teletype signals having an inverse binary relationship.

4. In a time division, multiplexed, telemetering and data logging system having means for transmitting and receiving binary series signals, the improvement comprising: distributor means coupled to said receiving means for sequentially distributing said binary signals to a plural stage register having coupled thereto a corresponding plurality of memory units; a collector; means responsive to a count discrepancy between one of said register stages and the corresponding memory unit for sequentially coupling said collector to said register stages; means coupled to said collector for producing teletype signals representing the count of said register; and, means for generating teletype date/time signals.

5. In a time division, multiplexed, telemetering and data logging system having means for transmitting and receiving binary series signals, the improvement comprising: distributor means coupled to said receiving means for sequentially distributing said binary signals to a plural stage register having coupled thereto a corresponding plurality of memory units; a collector; means responsive to a count discrepancy between one of said register stages and the corresponding memory unit for sequentially coupling said collector to said register stages; means for inhibiting said sequential coupling means whenever each such discrepancy is produced by a telemetered signal having a successively alternating binary value; means coupled to said collector for producing teletype signals representing the count of said register; and, means for generating teletype date/time signals.

6. In a time division, multiplexed, telemetering and data logging system having means for transmitting and receiving binary series signals from a plurality of out stations, the improvement comprising: a plural stage register for each of said out stations, said registers each having coupled thereto a corresponding plurality of memory units; distributor means coupled to said receiving means for sequentially distributing the binary telemetered signals from each of said out stations to the corresponding register; a collector; means responsive to a count discrepancy in any one of said registers between a register stage and the corresponding memory unit for sequentially coupling said collector to each stage of the register containing said count discrepancy; means coupled to said collector for producing teletype signals representing the count of the register containing said discrepancy; means for producing a teletype identification signal representing the register containing said discrepancy; and, means for generating teletype date/time signals.

7. The improvement of claim 6 further characterized by means for visually displaying the discrepancy status of each register stage with respect to a preselected state and means for reversing the visual discrepancy status display for any selected register stage.

8. In a time division, multiplexed, telemetering system having means for transmitting and receiving binary telemetered signals, the improvement comprising: signal monitoring means responsive to said binary telemetered signals for producing an aural reproduction of said signals; distributor means coupled to said receiving means for sequentially distributing said binary signals to a plural stage register having coupled thereto a corresponding plurality of memory units; means for producing teletype signals; and, means responsive to a count discrepancy between one of said register stages and the corresponding memory unit for actuating said teletype signal means.

9. The apparatus of claim 8 further characterized by said aural reproduction means producing a predetermined rhythm of aural signals whenever said binary telemetered signals have a preselected binary pattern.

10. The apparatus of claim 9 wherein said aural reproducing means comprises: an audio oscillator, said oscillator being keyed only by demodulated binary telemetered signals having a preselected binary value; and, loud speaker means coupled to said audio oscillator.

11. An apparatus for monitoring demodulated binary telemetered signals comprising: means for producing a predetermined rhythm of aural signals whenever said binary telemetered signals have a preselected binary pattern; and, means for restoring said predetermined rhythm whenever the binary pattern of said telemetered signals changes from said preselected pattern.

References Cited

UNITED STATES PATENTS

| | | | |
|---|---|---|---|
| 2,672,598 | 3/1954 | Hornfeck et al. | 340—151 |
| 3,138,791 | 6/1964 | Beguin | 340—151 X |
| 3,227,808 | 1/1966 | Morris et al. | 340—150 X |
| 3,289,165 | 11/1966 | Hawley et al. | 340—151 |

JOHN W. CALDWELL, Primary Examiner

H. I. PITTS, Assistant Examiner

U.S. Cl. X.R.

178—2; 340—147, 149, 151, 163